(12) United States Patent
Mongrain

(10) Patent No.: US 11,618,054 B2
(45) Date of Patent: Apr. 4, 2023

(54) WATER-, OIL- AND GREASE-RESISTANT MULTILAYER COATING FOR PAPER-BASED SUBSTRATE AND USES THEREOF

(71) Applicant: CASCADES SONOCO INC., Berthierville (CA)

(72) Inventor: Yvon Mongrain, Lavaltrie (CA)

(73) Assignee: CASCADES GROUPE PRODUITS SPÉCIALISÉS, Kingsey Falls (CA)

( * ) Notice: Subject to any disclaimer, the term of this patent is extended or adjusted under 35 U.S.C. 154(b) by 1038 days.

(21) Appl. No.: 16/288,331

(22) Filed: Feb. 28, 2019

(65) Prior Publication Data
US 2019/0291134 A1   Sep. 26, 2019

Related U.S. Application Data

(60) Provisional application No. 62/636,461, filed on Feb. 28, 2018.

(51) Int. Cl.
*B05D 7/00* (2006.01)
*B05D 1/26* (2006.01)
(Continued)

(52) U.S. Cl.
CPC .............. *B05D 7/56* (2013.01); *B05D 1/265* (2013.01); *B05D 5/08* (2013.01); *C09J 123/06* (2013.01);
(Continued)

(58) Field of Classification Search
CPC . B05D 1/265; B05D 5/00; B05D 5/08; B05D 7/56; B05D 7/58; B05D 2203/22; B05D 2507/01; B05D 2508/00; B05D 2518/00; B05D 2601/10; B32B 3/266; B32B 3/28; B32B 27/08; B32B 27/10; B32B 27/16; B32B 27/20; B32B 27/306; B32B 27/32; B32B 27/327; B32B 27/34; B32B 27/36; B32B 29/08; B32B 2255/12; B32B 2255/26; B32B 2255/28; B32B 2264/102; B32B 2264/104; B32B 2264/12; B32B 2270/00; B32B 2307/21; B32B 2307/402; B32B 2307/406;
(Continued)

(56) References Cited

U.S. PATENT DOCUMENTS 4,446,273 A    5/1984  Hiyoshi et al.
5,989,724 A *  11/1999 Wittosch ................ D21H 19/20
                                                 428/903.3
(Continued)

OTHER PUBLICATIONS

IGI Barrier Grip 9471B datasheet (Year: 2017).*
Spectra-Guard 3005 datasheet (Year: 2017).*

*Primary Examiner* — Christopher M Polley
*Assistant Examiner* — Sathavaram I Reddy
(74) *Attorney, Agent, or Firm* — Benoit & Cote Inc.; France Cote

(57) ABSTRACT

The present invention relates to a water-, oil- and grease-resistant multilayer coating for a paper-based substrate comprising a water-based inner primer coating, an intermediate polymeric extrusion coating, and a water-based top barrier coating, wherein a surface of the paper-based substrate coated therewith has water, oil and grease barrier properties, and wherein the paper-based substrate coated therewith is repulpable and recyclable.

22 Claims, 2 Drawing Sheets

(51) Int. Cl.
- *B05D 5/08* (2006.01)
- *C09J 125/12* (2006.01)
- *C09J 125/14* (2006.01)
- *C09J 125/10* (2006.01)
- *C09J 127/08* (2006.01)
- *C09J 123/06* (2006.01)
- *D21H 19/20* (2006.01)
- *D21H 19/24* (2006.01)
- *D21H 19/82* (2006.01)
- *D21H 21/16* (2006.01)

(52) U.S. Cl.
CPC ............ *C09J 125/10* (2013.01); *C09J 125/12* (2013.01); *C09J 125/14* (2013.01); *C09J 127/08* (2013.01); *D21H 19/20* (2013.01); *D21H 19/24* (2013.01); *D21H 19/82* (2013.01); *D21H 21/16* (2013.01); *B05D 2203/22* (2013.01); *B05D 2507/01* (2013.01); *B05D 2508/00* (2013.01); *B05D 2518/00* (2013.01); *B05D 2601/10* (2013.01); *B32B 2307/7246* (2013.01)

(58) Field of Classification Search
CPC ............ B32B 2307/41; B32B 2307/54; B32B 2307/546; B32B 2307/554; B32B 2307/56; B32B 2307/5825; B32B 2307/714; B32B 2307/718; B32B 2307/7246; B32B 2307/7248; B32B 2307/7265; B32B 2307/732; B32B 2307/75; B32B 2439/62; B32B 2439/70; B32B 2457/00; C08L 23/04; C08L 2205/025; C08L 2207/062; C08L 2207/066; C09D 123/04; C09J 123/06; C09J 125/10; C09J 125/12; C09J 125/14; C09J 127/08; D21H 19/20; D21H 19/24; D21H 19/82; D21H 21/16

See application file for complete search history.

(56) References Cited

U.S. PATENT DOCUMENTS

| | | | |
|---|---|---|---|
| 2009/0152268 A1 | 6/2009 | Whiteman et al. | |
| 2011/0027601 A1 | 2/2011 | Ruffner et al. | |
| 2013/0101855 A1* | 4/2013 | Cham | B32B 29/002 |
| | | | 428/512 |
| 2013/0225744 A1 | 8/2013 | Iyer et al. | |
| 2014/0272163 A1* | 9/2014 | Tilton | D21J 1/08 |
| | | | 427/427.4 |
| 2017/0029189 A1* | 2/2017 | Sanders | B65D 75/5855 |

* cited by examiner

WATER-, OIL- AND GREASE-RESISTANT MULTILAYER COATING FOR PAPER-BASED SUBSTRATE AND USES THEREOF

BACKGROUND

(a) Field

The subject matter disclosed generally relates to a water-, oil- and grease-resistant multilayer coating for paper-based substrate while preserving its printability and ability to be glued, and uses thereof.

(b) Related Prior Art

Fibrous substrates such as paper-based substrates are widely used in packaging operations. However, paper-based substrates have very poor resistance to penetration by, for example, water, gases, oils, greases and solvents, which gradually penetrate the paper-based substrate and decreases its mechanical strengths. To improve the resistance to penetration by such substances, paper-based substrates have been coated with a variety of treatment materials. Wax coating and polymer extrusion coating are examples of such treatments.

Although providing water resistance to paper-based substrate, wax coating provides limited applications. In fact, wax coated paper-based substrates are essentially not repulpable and/or recyclable. Moreover, wax coating is poorly resistant to high (e.g. melting) and low temperatures (e.g. cracking). Polymer extrusion is an established processing technology resulting in production of multilayer structures. The operation involves melting of a thermoplastic to be applied onto a paper-based substrate. Polyethylene (PE) has been traditionally used for imparting properties such as water-, oil- and grease-resistance to the paper-based substrate, as well as other barrier properties. Nevertheless, there are issues arising from a PE coated paper-based substrate, for example PE coating will melt in the hot corrugating process.

Therefore, a need exists for a coating such that the paper-based substrate has relatively high water-, oil- and grease-resistance while preserving its printability and ability to be glued.

SUMMARY

According to an embodiment, there is provided a water-, oil- and grease-resistant multilayer coating for a paper-based substrate comprising a water-based inner primer coating, an intermediate polymeric extrusion coating, and a water-based top barrier coating, in which a surface of the paper-based substrate coated therewith may have water, oil and grease barrier properties, and the paper-based substrate coated therewith may be repulpable and recyclable (HySHIELD™).

The water-based inner primer coating may act as an adhesion promoter for the intermediate polymeric extrusion coating.

The intermediate polymeric extrusion coating may provide flexibility, water, oil and grease barrier properties.

The water-based top barrier coating may provide an additional water, oil and grease barrier properties onto the intermediate polymeric extrusion coating.

The water-based top barrier coating may act as a protective layer for the intermediate polymeric extrusion coating for corrugated applications.

The water-, oil- and grease-resistant multilayer coating may preserve the physical properties of the surface of the paper-based substrate coated therewith.

The physical properties may comprise mechanical strength, printability and gluability.

The mechanical strength may comprise resistance to tear, burst, ring crush, short span compression strength (STFI), tensile, tensile energy absorption (TEA) stiffness, box compression (BCT), edge crush (ECT), flat crush crush (FCT) or a combination thereof.

The inner primer coating may comprise a water-based composition having at least one solvent-based adhesive.

The solvent-based adhesive may comprise water as a solvent.

The intermediate polymeric extrusion coating may be obtained by extrusion of a polymer or co-extrusion of polymers.

The intermediate polymeric extrusion coating may further comprise a low surface tension polymer.

The low surface tension polymer may be low density polyethylene (LDPE).

The top barrier coating may comprise a water-based composition having at least one polymer providing water, oil and grease barrier properties.

The solvent-based adhesive may be selected from the group consisting of polyethyleneimine (PEI), styrene-butadiene copolymer, styrene-acrylic copolymer, styrene-acrylic-acrylonitrile copolymer, polyester-polyurethane elastomer, acrylates, starch, PVOH (polyvinyl alcohol), PVAc (polyvinyl acetate), PVDC (polyvinylidene chloride), LDPE emulsions, HDPE emulsions, Nylon emulsions, clay coating and dextrin or combinations thereof.

The polymer to be extruded or co-extruded may be selected from the group consisting of polyethylene (PE), polylactic acid (PLA), PBS, PBAT, PP, PET, Nylon, EVOH, EMA, and combinations thereof.

The water-, oil- and grease-resistant multilayer extrusion coating may further comprise an inorganic master batch as a filler.

The inorganic master batch may be selected from the group consisting of calcium carbonate, clays, talc, titanium dioxide, colour dyes and combinations thereof.

The polyethylene may be selected from the group consisting of low-density polyethylene (LDPE), high-density polyethylene (HDPE), metallocene linear low-density polyethylene (mLLDPE) and combinations thereof.

The top coat may have at least one polymer that may be selected from the group consisting of styrene-acrylic copolymer, styrene-acrylic-acrylonitrile copolymer, styrene-butadiene copolymer, PVDC, PVOH, Starch, PLA emulsion, PHA/PHB emulsion, LDPE emulsions, HDPE emulsions, Nylon emulsions, polyurethane, silicones emulsions and combinations thereof.

The surface of the paper-based substrate coated therewith may present a Cobb test value below 2.0 gram of water/$m^2$, a Water Vapor Transmission Rate (WVTR) test value below 60.0 grams of water/$m^2$, a surface tension test value at least about 50.0 dynes/cm and an oil and grease resistance 3M kit test value of at least about 12.0.

According to another embodiment, there is provided a water-, oil- and grease-resistant multilayer coating for paper-based substrate comprising an inner water-based primer coating comprising polyethyleneimine (PEI), an intermediate polymeric extrusion coating comprising co-extruded low-density polyethylene (LDPE) and high-density polyethylene (HDPE) by weight ratio about 40/60 respectively and an top water-based barrier coating comprising IGI Barrier Grip 9471B.

According to another embodiment, there is provided a water-, oil- and grease-resistant multilayer coating for paper-based substrate comprising an inner water-based primer coating comprising polyethyleneimine (PEI), an intermediate polymeric extrusion coating comprising co-extruded low-density polyethylene (LDPE) and high-density polyethylene (HDPE) in a three-layers HDPE-LDPE-HDPE arrangement where HDPE represents at least 60% by weight of the total weight of the intermediate polymeric extrusion coating and an top water-based barrier coating comprising IGI Barrier Grip 9471B.

The water-, oil- and grease-resistant multilayer coating may comprise 0.01 g/m$^2$ (0.001 to 0.16 g/m$^2$) of PEI, 10 g/m$^2$ (2 to 50 g/m$^2$) of the three-layers arrangement and 5 g/m$^2$ (5 to 40 g/m$^2$) of the IGI Barrier Grip 9471B.

According to another embodiment, there is provided a water-, oil- and grease-resistant multilayer coating for paper-based substrate, comprising an inner water-based primer coating comprising polyethyleneimine (PEI), an intermediate polymeric extrusion coating comprising low-density polyethylene (LDPE) and high-density polyethylene (HDPE) as a blend or in a three-layers HDPE-LDPE-HDPE arrangement or a co-extruded three-layer LD-HD-LD where HDPE represents 60% by weight of the total weight of the intermediate polymeric extrusion coating and an top water-based barrier coating comprising Spectra-Guard 3005

The water-, oil- and grease-resistant multilayer coating may comprise 0.01 g/m$^2$ (0.001 to 0.16 g/m$^2$) of PEI, 10 g/m$^2$ (2 to 50 g/m$^2$) of the three-layers arrangement and 0.1 g/m$^2$ (0.01 to 40 g/m$^2$) of Spectra-Guard 3005, in which the water-, oil- and grease-resistant multilayer coating provides a surface tension below 30 dynes/cm.

The use of the water-, oil- and grease-resistant multilayer coating in industrial applications may comprise anti-corrosion roll heads for wire coil having moisture and water barrier, food transportation boxes with aroma barrier, oil and grease resistant colored barriers, high-performance and durable anti-abrasives, anti-static for packaging static-sensitive components having a moisture barrier, more efficient and economical compostable barrier, or combinations thereof.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or".

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. However, the following definitions refer to the particular embodiments described herein and are not to be taken as limiting; the invention includes equivalents for other undescribed embodiments. In addition, the materials, methods, and examples are illustrative only and not intended to be limiting.

As used herein, the term "coating" is intended to mean compositions or substances to be applied onto a surface, for example, solutions, colloidal dispersions, suspensions and emulsions as they are conventionally defined. In papermaking, the term coating refers to a paper-based substrate finishing operation in which the surface of a paper-based substrate is covered with a substance to impart a desired finish, achieve specific barriers properties or textures to the paper-based substrate and improve its printability are examples of the reasons why a paper-based substrate needs to be coated. Coatings provide a smooth paper-based substrate surface, and the amount and composition of a particular coating affects such properties as ink absorbency and ink holdout. Coatings also enhance the whiteness, opacity, and gloss of paper-based substrate. Coatings are typically made up of pigments and binders (also called adhesives). Pigments are usually made of refined clay (which enhances gloss and ink holdout), titanium dioxide (which enhances brightness and opacity), or calcium carbonate (which enhances ink absorbency, and brightness). Binders are added to increase the adhesion of the particles of pigment to each other and to the paper-based substrate. Coatings can either be added on the papermaking machine (called on-machine coating) or on a separate machine (called off-machine coating). There are a variety of methods used for applying coatings, such as the use of blade, air knife, curtain, slot die, gravure, reverse gravure, 3-roll, metering size press, spray, rod coaters and flexo printing. Coating can be applied to one side of a paper-based substrate—called coated one side—or coated on both sides—called coated two sides.

As used herein, the term "paper-based substrate" is intended to mean a paper-based substrate of an amalgamation of fibers that can include, at least in part, vegetable, wood, and/or synthetic fibers. As appreciated, other components can be included in the paper-based substrate such as paper, paperboard, or fiberboard. For the present disclosure, the term "paper-based substrate" encompasses and is interchangeable with the terms "paper," "paperboard," and "fiberboard" unless such a construction is clearly not intended, as will be clear from the context in which this term is used.

As used herein, the term "primer" is intended to mean a coating that is applied to a paper-based substrate to prepare the surface of the paper-based substrate for subsequent modification, for example, the addition of layers.

As used herein, the term "polymer" is intended to mean a polymeric compound prepared by polymerizing monomers, whether of the same or a different type. The generic term polymer thus embraces the term "copolymer" which refers to polymers prepared from two or more different monomers.

As used herein, the term "surface" is intended to mean the exterior or upper boundary of an object or body including the adjoining atmosphere.

As used herein, the term "water-, oil- and grease-resistant" is intended to mean sufficiently impassible to liquid water and/or moisture vapor, oils and greases so as to preserve physical properties of a surface exposed therewith.

As used herein, the term "physical properties" is intended to mean any desirable properties of a paper-based substrate for packaging use, such as mechanical strengths, printability, ability to be glued (i.e. hot and cold glue) and resistance to penetration by, for example, water (i.e. liquid and/or moisture vapor), gases, oils, greases and solvents.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In embodiments there are disclosed an impermeable multilayer coating for paper-based substrate while preserving its printability and ability to be glued, and uses thereof.

Figure 1:
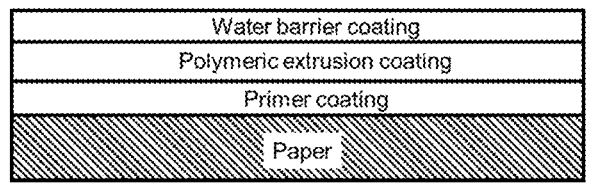
FIG. 1 illustrates a schematic representation of a water-, oil- and grease-resistant multilayer coating for a paper-based substrate, according to an embodiment.

Now referring to FIG. 1, there is shown an impermeable multilayer coating for paper-based substrate comprising:
a water-based inner primer coating which acts as adhesion promoter for the polymeric extrusion coating;
an intermediate polymeric extrusion coating, and
a water-based top barrier coating having water barrier properties.

The top coating, in addition to provide water barrier properties to the coated paper-based substrate, also acts as a "protective" layer for the intermediate polymeric extrusion coating. For instance, the top coating may protect the intermediate polymeric extrusion coating against heat and pressure/abrasion, such as heat in a corrugator from about 150° C. to 230° C.

The advantages of the present invention include that the coated paper-based substrate therewith provides resistance to elevated temperatures in the corrugator, printability and ability to be glued. Another advantage is that it requires rather low amounts of each coatings compared to wax coatings while still presenting very good water, oil and grease barrier properties.

As presented in Table 1 below, there is provided examples of top barrier coating for corrugated applications, in which a paper-based substrate is shaped into a series of parallel ridges and/or grooves so as to give added rigidity and strength via the action of heating the paper-based substrate in a corrugator. In this embodiment, only the medium goes through the corrugator and after corrugation, the two liners are glued on each side.

TABLE 1

Examples of top barrier coating for corrugated applications.

| Supplier | Name |
| --- | --- |
| Michelman | MC81 ™ |
| Michelman | MC82 ™ |
| Michelman | V2200R ™ |
| Michelman | MC51 ™ |
| Michelman | 40EAF ™ |
| Michelman | MC55 ™ |
| Michelman | MC415 ™ |
| Michelman | X300AFG ™ |
| Michelman | Hydraban708 ™ |
| Spectra-Kote | Spectra-Guard 3000 ™ |
| Spectra-Kote | Spectra-Guard 3003 ™ |
| Spectra-Kote | Spectra-Guard 3002-A ™ |
| Spectra-Kote | Spectra-Guard 3005 ™ |
| Spectra-Kote | Spectra-Guard 3005-R ™ |
| Spectra-Kote | Spectra-Guard 3006 ™ |
| Spectra-Kote | Spectra-Guard 3006-BK ™ |
| Spectra-Kote | Spectra-Guard 3007-BK ™ |
| Spectra-Kote | Spectra-Guard 2N1 ™ |
| Spectra-Kote | Spectra-Guard FR-Kote ™ |
| Michelman | Nomar 70 ™ |
| Top Chim | Top Corr 70A ™ |
| Top Chim | Topscreen DS3V ™ |
| IGI | Aquaban 9009A ™ |
| IGI | EC442 ™ |
| IGI | BakeGuard 9471B ™ |
| IGI | EC403 ™ |
| Spectra-Kote | Spectra-Guard 3N1 ™ |
| Rohm&Haas | Serfene 546 ™ |
| IGI | R5701A/BarrierGrip ™ |
| Retec | 7650PLR3 ™ |
| IGI | Aquaban 9001A ™ |
| Spectra-Kote | Spectra-Guard 3010-A ™ |
| IGI | R5701H/BarrierGrip |

As presented in Table 2 below, there is provided examples of top barrier coating for other applications, for examples, color, waxable white, slip, anti-slip, corrosion inhibitor, antistatic, release, oxygen barrier, anti-abrasive and heat sealability.

TABLE 2

Examples of top barrier coating for other applications.

| Supplier | Name |
| --- | --- |
| Michelman | Softac 250 ™ |
| Michelman | Rustban 105 ™ |
| Michelman | Rustban 250 ™ |
| Michelman | Release coat RLCP1 ™ |

TABLE 2-continued

Examples of top barrier coating for other applications.

| Supplier | Name |
|---|---|
| Michelman | Release coat RLCP1HS ™ |
| Spectra-Kote | Spectra-Guard NS5 ™ |
| Clariant | Cartaseal APM ™ |
| Clariant | Cartaseal ASM ™ |
| IGI | No rub green ™ |
| IGI | No Rub clear ™ |
| IGI | EC402 ™ (Release) |
| Spectra-Kote | White-Kote SG 123-A ™ |
| Spectra-Kote | White-Kote 123-C ™ |

The polymer to be extruded or co-extruded can be polyethylene (PE), polylactic acid (PLA), PBS (Polybutylene succinate), PBAT (Polybutyrate adipate terephthalate), PP (Polypropylene), PET (polyethylene terephthalate), Nylon, EVOH (ethylene vinyl alcohol), EMA (Poly(ethylene-co-methyl acrylate), or combinations thereof. Moreover, the polymeric extrusion coating can further comprise an inorganic master batch as a filler, such as calcium carbonate, clays, talc, titanium dioxide, black carbon and combinations thereof.

The top barrier coating can be styrene-acrylic copolymer, styrene-acrylic-acrylonitrile copolymer, styrene-butadiene copolymer, PVDC (polyvinylidene chloride), PVOH (polyvinylalcohol), Starch, PLA emulsion, PHA/PHB (Polyhydroxyalcanoate)/(poly(β-hydroxybutyrate) emulsion, LDPE (low density polyethylene) emulsions, HDPE (high density polyethylene) emulsions, Nylon emulsions, polyurethane emulsions, silicones emulsions or combinations thereof.

The present invention will be more readily understood by referring to the following examples which are given to illustrate the invention rather than to limit its scope.

Example 1

Evaluation of a Polyethylene Extrusion Layer Combined with a Water-Based Top Coating Aims Evaluation of a primed paper-based substrate with polyethylene imine (PEI), then extruded with polyethylene (PE) which was Corona-treated to increase surface tension, in combination with a water-based top coating. One of the main advantages of using a water-based top coating would be protecting the PE layer, which tends to soften and melt in the corrugator due to high temperatures (e.g. about 150° C.-230° C.). The resulting product would serve as a water, oil and grease barrier for paper-based substrate.

Methods

Low-density polyethylene (LDPE) and high-density polyethylene (HDPE) have different properties, such as melting temperatures between 105° C.-115° C. and between 120° C.-180° C. respectively. Thus, in the context of PE extrusion and co-extrusion coating optimization, one skilled in the art will understand that the relative amount and distribution of LDPE and HDPE are crucial parameters for conferring heat resistance to a surface, more particularly regarding HDPE.

Figure 2A:
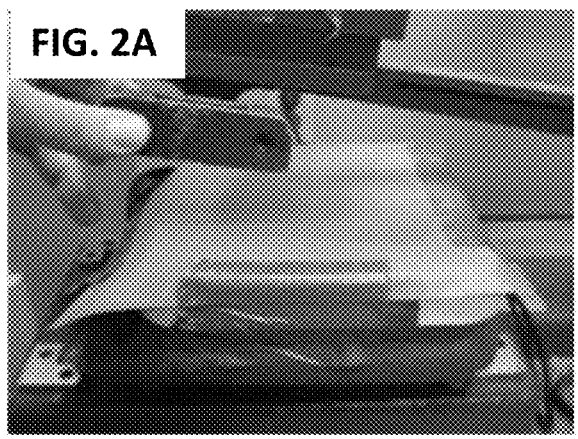
FIGS. 2A, 2B, and 2C illustrate representative pictures of the heated scuff test for evaluation of the polyethylene (PE) extrusion layer in combination with the water-based top coating. The FIG. 2A showing the heated scuff set-up, FIG. 2B AAB co-extrusion heated scuff results and FIG. 2C BAB co-extrusion heated scuff results, according to an embodiment.

The following combination was tested:
- a primer of Adcote 313 (PEI) was applied to 0.01 g/m² dry coat weight;
- a PE extrusion coating consisting of a co-extrusion of LDPE and HDPE with a 2.0 lb/1000 ft² target. Two rolls were produced with the same co-extrusion (AAB or BAB) having a total thickness of 10 μm, in which: (A) LDPE is in a ratio of 40% of the total thickness of the PE extrusion layer and (B) HDPE is in a ratio of 60% of the total thickness of the PE extrusion layer. These extrusion layers were Corona-treated (i.e. a treatment using a low surface tension polymer such as LDPE) to increase surface tension above 38 dynes/cm (target 54 dynes/cm) so the water-based top coating can adhere and spread on the polymeric extrusion coating; and
- a water-based top coating consisting of 6 g/m² of IGI BarrierGrip 9471B, and Heated scuff test was performed to evaluate heat resistance of coated paper-based substrate with AAB versus BAB co-extrusion layer in combination with the water-based top coating. Heated scuff test was performed on roll extruded in the last trial (FIG. 2A). Samples were put on a hotplate at 350° F. Test was performed with the scuff tester at two different pressure (9.5 and 2.2 psi).

Results

Figure 2B:
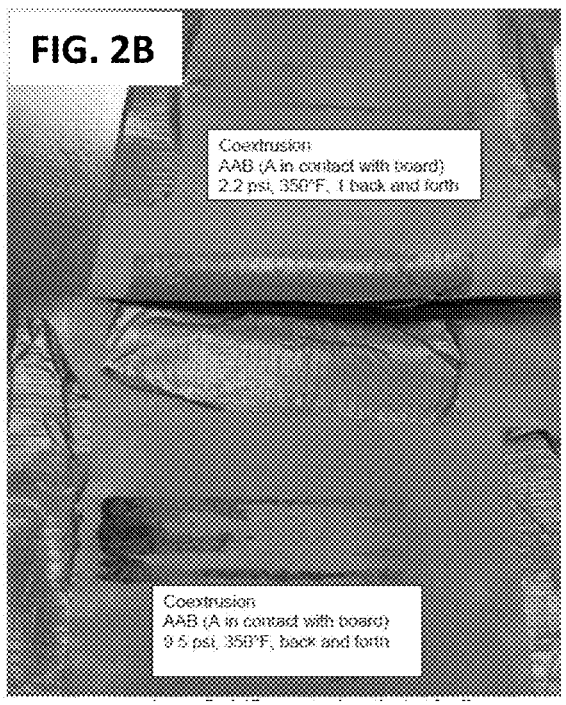
Figure 2C:
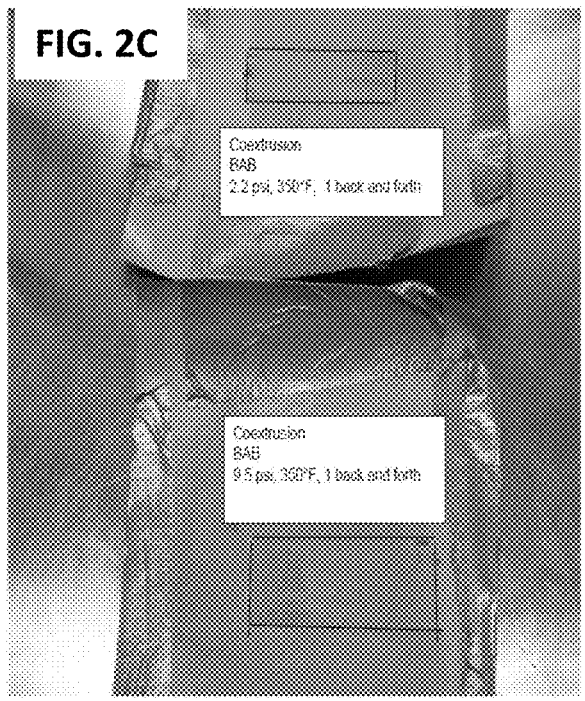

According to heated scuff test, the BAB co-extrusion is more resistant than the AAB co-extrusion (B is HDPE and A, LDPE) while combined with the water-based top coating (FIGS. 2B-C).

PE basis weight was at 2.5 lb/1000 ft² on roll 20170502652 and 2.2 lb/1000 ft² on roll 20170502654.

As presented in Table 3 below, there is provided results from various physical properties evaluation tests demonstrating why 6 g/m² dry of top coat was selected. More precisely, 4 g/m² of IGI Barrier Grip was not sufficient to inhibit the heat sealing aptitude of the extrusion layer. However, by starting from 7 g/m², which can be lower but higher than 4 g/m², the heat sealing goes from strong to blocking (weak—no fiber peeled) meaning a very slight tackiness and no longer a heat seal with fiber peeled. Table 3 also shows some of the other physical properties given to the top coated extrusion polymer such as higher surface tension, greater oil and grease barrier, while presenting the same WVTR.

TABLE 3

| Evaluation of the physical properties of the water-based top coating. | | | | | |
|---|---|---|---|---|---|
| Coating vanish (g/m²) | 0 | 4 | 7 | 10 | 12 |
| Cobb test - 30 min (individual results) (g water/m²) | 22; 14; 37; 40 | 1; 6; 3; 8; 10 | 1; 162; 0.9; 0.4; 0.1 | 0.5; 0.3; 0.0; 0.3; 6.9 | 0.8; 0.4; 0.1; 0.0; 0.1 |
| Surface energy measurement (Accu Dyne test) (dynes/cm) | 32 | 32 | 46 | 48 | 48 |
| Oil and Greases resistance test (3M Kit test) | 8 | 10 | >12 | >12 | >12 |

TABLE 3-continued

Evaluation of the physical properties of the water-based top coating.

| Coating vanish (g/m$^2$) | | 0 | 4 | 7 | 10 | 12 |
|---|---|---|---|---|---|---|
| Heat sealing aptitude at 191° C. (376° F.), 24 psi on KVK 283 g/m$^2$ | 5 s | Strong | Strong | Blocking (weak) | Blocking (weak) | Blocking (weak) |
| | 10 s | Strong | Strong | Blocking (weak) | Blocking (weak) | Blocking (weak) |
| | 15 s | Strong | Strong | Blocking (weak) | Blocking (weak) | Blocking (weak) |
| | 30 s | Strong | Strong | Blocking (weak) | Blocking (weak) | Blocking (weak) |
| "Blocking" aptitude at 70° C. (158° F.), 5 psi, 5 min | Coated side on coated side | None | None | None | Blocking weak | None |
| WVTR, tropical conditions (2 measurements) (g water/m$^2$ for 24 h) | | 44 ± 1[2] | 54 ± 1 | 49 ± 3 | 49 ± 2 | 49 ± 1 |

After separation in the CED solvent, the film still contains compounds from the Barrier Grip 9156B coating (verified via an infrared analysis).
Pin holes presence detected.

The Cobb test is performed for 30 minutes using TAPPI method T441, the WVTR test is performed for 24 hours at tropical conditions using TAPPI method T464, the tension surface test is performed using dyne pens method, and the 3M kit test is performed using TAPPI method T559.

Example 2

Evaluation of Boxes without Wax Coated with a Water-Based Top Coating

Aims

Evaluation of performances of boxes without wax coating with a water-, oil- and grease-resistant multilayer coating structure including a water-based top coating at the customer via the analysis of their physical properties.

Methods

A hundred boxes made of corrugated paperboard were produced with glue assist perforations only on one side of the coated liner. The boxes without wax were coated with the following water-, oil- and grease-resistant multilayer coating structure and used for both single facer (SF) and double backer (DB) of the following corrugated structure:
  an inner water-based primer coating comprising 0.01 g/m$^2$ dry of polyethyleneimine (PEI);
  an intermediate polymeric extrusion coating comprising 10 g/m$^2$ of co-extruded LDPE (i.e. A) and HDPE (i.e. B) in a three-layers HDPE-LDPE-HDPE (i.e. BAB) arrangement, where HDPE represents 60% by weight of the total weight of the intermediate polymeric extrusion coating, which was Corona-treated (i.e. a treatment using a low surface tension polymer such as LDPE) for tension surface increase above 38 dynes/cm (target 54 dynes/cm) so the water-based top coating can adhere and spread on the polymeric extrusion coating; and
  an top water-based barrier coating comprising 5 g/m$^2$ of IGI Barrier Grip 9471B for providing water-, oil- and grease-resistance.

Boxes were conditioned for 24 hours (normal and refrigerated conditions). Five boxes were sent to the customer and were used in the field to put in romaine lettuce. Then, they were packed on the bottom layer of a pallet. Boxes weighed about 42 lbs. Upon arrival from the field, boxes were placed in the cooler for 24 hours and were exposed to a vacuum of 5.5 mm Hg and a temperature of 32 to 35° F. Cold air was injected into the chamber. To simulate the rain, boxes were then watered. Thereafter, the boxes were refrigerated for another 24 hours.

Results

Figure 3:
FIG. 3 illustrates a representative picture of a coated box using the water-based top coating. The pictures showing that the coated box has preserved its ability to be glued using coldest adhesive (i.e. aqueous-based adhesive), more particularly at the side seam coating to coating, according to an embodiment.

The water-based glue applied on the tab seemed to be strong enough due to total fiber pull observed when the tab was delaminated. Coated boxes have preserved their ability to be glued, more particularly at the side seam (FIG. 3).

After 24 hours of refrigeration, boxes had no major defects except that they had bulged slightly, some corners had crushed and the DB liner had delaminated in some places. The box bundle was watered to simulate the rain. The bundle was refrigerated for another 24 hours. The boxes remained intact and they did not collapse. The liners and the medium did not absorb water, but only a little moisture. Boxes were successful according to the customer.

The coated liners with the water-based top coating have preserved the ability to adhere with the treated medium2. In fact, one skilled in the art will understand that if the adhesion is not adequate, regardless of the barrier properties of the coated box, the components (i.e. liner-medium-liner) will dissociate. It is appreciated that the water-based top coating did not affect the adhesion of the components to the cold set glue for the side seam.

Figure 4A:
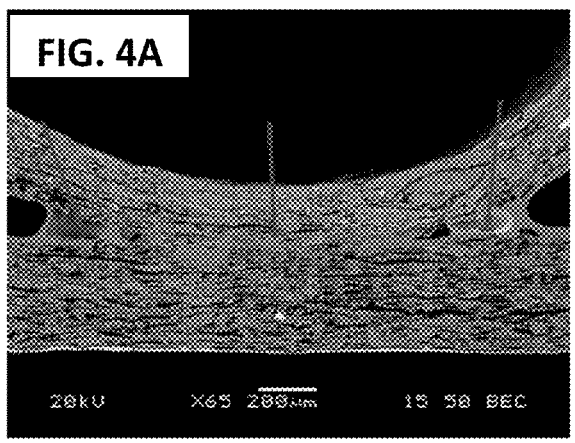
FIGS. 4A and 4B illustrate representative pictures of the adhesion of the back side of a paper-based substrate coated with the water-based top coating on the opposite side, which is coated with the same treatment than treated medium 2 chemistry, with the treated medium 2 medium. The cross-sections images showing that the adhesion of the starch adhesive medium to single face (SF) and medium to double back (DB) is adequate, according to an embodiment.
Figure 4B:
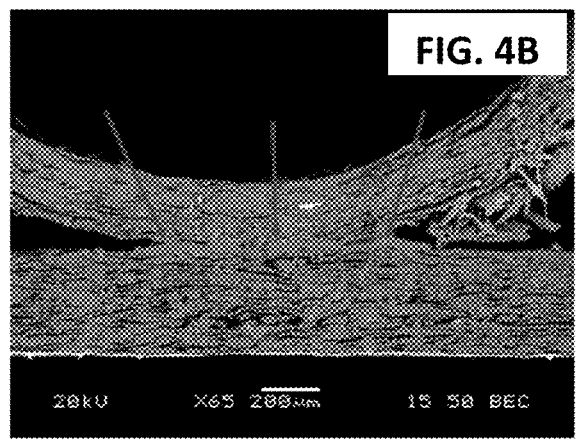

Cross sections of medium glued to SF and DB show that adhesion is adequate at two inches from both edges and in the center (FIGS. 4A-B). As shown in Table 4, results show that the SF and DB adhesion of the components (i.e. liner-medium-liner) is successful.

TABLE 4

Box adhesion results (177440).

| | | HySHIELD ™ | |
|---|---|---|---|
| Tests | Units | Avg. | Std. dev. |
| Basis Weight | | | |
| Double Back Medium Single Face Adhesive nominal weight | g/m$^2$ | 296 Kraft with PE 207 SCCM 296 Kraft with PE WRA 273 - 195 - 273 | |

TABLE 4-continued

Box adhesion results (177440).

| | | HySHIELD ™ | |
|---|---|---|---|
| Tests | Units | Avg. | Std. dev. |
| Caliper | | | |
| Average of 10 | mm | 4.48 | 0.01 |
| Edge Crush Test (ECT) | | | |
| Average of 10 | lbf/in | 56 | 5 |
| Flat Crush Test (FCT) | | | |
| Average of 10 | kPa | 453 | 16 |
| Pin Adhesion | | | |
| Double Back Single Face | Left side | kg/m of glue line | 84 84 | 2 2 |
| Double Back Single Face | Center | | 72 89 | 2 3 |
| Double Back Single Face | Right side | | 73 84 | 5 3 |
| Minimum | | | 60 | |
| Target | | | 75 | |

Box compression results of boxes without wax coated with the water-based top coating are between those of wax curtain coated boxes (lower) and wax cascaded boxes (Table 5).

TABLE 5

Box compression results (177440).
Top to bottom Compression - kgf (deflection - mm)

| Average of 5 | Water-based top coating box | 480 | 25 |
|---|---|---|---|
| Deflection | | 10.0 | 0.8 |
| Average of 5 | Wax Cascaded box* | 545 | 23 |
| Deflection | | 9.9 | 0.5 |
| Average of 5 | Wax curtain coated box | 403 | 22 |
| Deflection | | 11.4 | 1.0 |

*Components are not known

Box without wax that are coated with the water-based top coating has similar basis weight composition than the wax curtain coated box. Wet shear values are below the wax curtain coated box, but are over the target. It seems that the SF side always failed first for the box without wax coated with the water-based top coating compared to the wax curtain coated box which failed on both sides (Table 6). Wet pin adhesion values on the box without wax coated with the water-based top coating are similar on the DB side and lower on the SF side compared to the wax curtain coated box, but are over the target (Table 6). Therefore, these results depend on starch parameters, amount of starch, amount of cross-linker of starch and machine parameters which are not affected by the water-based top coating.

TABLE 6

Box adhesion results (177433).

| | | Water-based top-coating | | Curtain coated box | |
|---|---|---|---|---|---|
| Test | Units | Avg. | Std. dev. | Avg. | Std. dev. |
| Basis weight | | | | | |
| Double Back Medium | g/m² | 296 Kraft with PE 207 SCCM | | 317 WTK with Wax 205 SCCM (with treatment) | |

TABLE 6-continued

Box adhesion results (177433).

| | | Water-based top-coating | | Curtain coated box | |
|---|---|---|---|---|---|
| Test | Units | Avg. | Std. dev. | Avg. | Std. dev. |
| Single Face Adhesive | | 296 Kraft with PE WRA | | 317 Kraft with Wax WRA | |
| Possible nominal weight | | 273 - 195 - 273 | | 273 - 195 - 273 | |
| Ply separation (Quality of WRA) | | | | | |
| Double back Single face | mm | 0 0 | | 0 0 | |
| Target | | ≤6 | | | |
| Wet shear test* | | | | | |
| Trial #1 | 1 kg Sec. | >600 | | >600 | |
| Trial #2 | | >600 | | >600 | |
| Trial #3 | | >600 | | >600 | |
| Trial #4 | | >600 | | >600 | |
| Trial #5 | | >600 | | >600 | |
| Average of 5 | | >600 | | >600 | |
| Trial #1 | 2 kg | >600 (677) - SF side failed | | >600 (1210) - SF/DB sides failed | |
| Trial #2 | | >600 (826) - SF side failed | | >600 (878) - DB side failed | |
| Trial #3 | | >600 (658) - SF side failed | | >600 (901) - SF/DB sides failed | |
| Trial #4 | | >600 | | >600 | |
| Trial #5 | | >600 | | >600 | |
| Average of 5 | | >600 (720) | | >600 (996) | |
| Wet pin adhesion | | | | | |
| Double Back Single Face | kg/m of glue line | 7.7 4.5 | 0.3 0.7 | 7.8 7.8 | 0.4 0.5 |
| Minimum | | | | 3.0 | |

*Seconds between parentheses show the failing time.

Example 3

Wet Box Compression of Treated Medium 1 and Treated Medium 2 Boxes Produced with HySHIELD™ Liners Aims Evaluate properties on wet boxes (BCT).

Methods

The samples were immersed in a container with water at room temperature for 1 minute, then the water is allowed to drain from the box for 2 minutes.

Results

TABLE 7

| Properties | HySHIELD ™ with treated medium 2 | Curtain coated both sides |
|---|---|---|
| Construction | 56-40-56 | 56-40-56 |
| Total basis weight | 846 gsm | 911 gsm |
| Retention after refrigeration | 97% | 102% |
| Retention after immersion in water | 35% | 9% |

Example 4

Evaluation of Sheets and Boxes Produced with HySHIELD™ Liners for the Gardening Market and Comparison with Curtain Coated Boxes

Introduction

HySHIELD™ gardening market boxes are developed to replace traditional waxed boxes. Both liners have HySHIELD™ treatment and two different mediums were used and compared. Medium from CECC-Cabano with treated medium 2 treatment and medium from Mississauga with treated medium 1.

Aims

Evaluate properties on sheets and boxes.

Compare both corrugated sheets production with treated medium 1 and 2 used to produce corrugated sheets.

Compare both HySHIELD™ boxes made with treated mediums 1 and 2 with curtain coated boxes at standard and refrigerated conditions.

Results

ECT and T/B Compression properties performed at refrigerated conditions (~4.0° C. and ~80% R.H.) for all boxes were comparable with the ones performed at standard conditions (23° C. and 50% R.H.).

TABLE 8

Sheet results (HySHIELD ™ treated medium 2*)

| Tests | Units | Side 1 C flute corrugated sheet | | Middle C flute corrugated sheet | | Side 2 C flute corrugated sheet | |
|---|---|---|---|---|---|---|---|
| | | Average | Std. Dev. | Average | Std. Dev. | Average | Std. Dev. |
| Basis Weight | | | | | | | |
| Double Back* | g/m$^2$ | | | 284 Recycled | | | |
| Medium | | | | 196 SCCM | | | |
| Single Face* | | | | 281 Recycled | | | |
| Adhesive | | | | WRA | | | |
| Total combined board weight | g/m$^2$ | | | 865 | | | |
| Spec. Nominal Weight | | | | 273-195-273 | | | |
| Poss. Nominal Weight | | | | 273-195-273 | | | |
| Poss. Nominal Weight | lb/1000 ft$^2$ | | | 56-40-56 | | | |
| Possible SAP code | | | | C60RB-RB | | | |
| Caliper | | | | | | | |
| Average of 10 (Unprinted) | mm | | | 4.36 | | 0.02 | |
| Edge Crush Test (ECT) | | | | | | | |
| Average of 4 | lbf/in | 59 | 2 | 59 | 2 | 60 | 2 |
| Minimum | | 60 | | 60 | | 60 | |
| Nb. under minimum | | 3 | | 2 | | 3 | |
| Flat Crush Test (FCT) | | | | | | | |
| Average of 4 | kPa | 378 | 15 | 359 | 10 | 361 | 10 |
| Minimum | | 283 | | 283 | | 283 | |
| Target | | 331 | | 331 | | 331 | |
| Pin Adhesion | | | | | | | |
| Double Back | kg/m of glue line | 67 | 1 | 69 | 1 | 67 | 5 |
| Single Face | | 56 | 3 | 59 | 7 | 52 | 1 |
| Minimum | | 60 | | 60 | | 60 | |
| Target | | 75 | | 75 | | 75 | |
| X - test observations | | | | | | | |
| Double Back | | | | Good (image 4) | | | |
| Single Face | | | | Poor (image 5) | | | |
| Glue line measurement | | | | | | | |
| Double Back liner | mm | 1.6 | 0.5 | 1.4 | 0.3 | 1.4 | 0.5 |
| Double Back medium | | 1.6 | 0.4 | 1.4 | 0.3 | 1.6 | 0.3 |
| Ratio DB liner/DB medium | | 1.0 | | 1.0 | | 0.9 | |
| Recommended minimum | | 0.7 | | 0.7 | | 0.7 | |
| Single Face medium | | 2.9 | 0.5 | 3.0 | 0.4 | 3.2 | 0.2 |
| Single Face liner | | 2.8 | 0.3 | 2.8 | 0.4 | 2.7 | 0.2 |
| Ratio SF liner/SF medium | | 1.0 | | 0.9 | | 0.8 | |
| Recommended minimum | | 0.7 | | 0.7 | | 0.7 | |

Legend:
*Liners had approximately 2 to 3 lb/1000 ft$^2$ of PE and coating

TABLE 9

Sheet results (HySHIELD™ treated medium 1*)

| Tests | Units | Side 1 C flute corrugated sheet | | Middle C flute corrugated sheet | | Side 2 C flute corrugated sheet | |
|---|---|---|---|---|---|---|---|
| | | Average | Std. Dev. | Average | Std. Dev. | Average | Std. Dev. |
| Basis Weight | | | | | | | |
| Double Back* | $g/m^2$ | | | 281 Recycled | | | |
| Medium | | | | 192 SCCM | | | |
| Single Face* | | | | 285 Recycled | | | |
| Adhesive | | | | WRA | | | |
| Total combined board weight | $g/m^2$ | | | 850 | | | |
| Spec. Nominal Weight | | | | 273-195-273 | | | |
| Poss. Nominal Weight | | | | 273-195-273 | | | |
| Poss. Nominal Weight | $lb/1000\ ft^2$ | | | 56-40-56 | | | |
| Possible SAP code | | | | C60RB-RB | | | |
| Caliper | | | | | | | |
| Average of 10 (Unprinted) | mm | 4.28 | 0.01 | 4.28 | 0.02 | 4.28 | 0.01 |
| Edge Crush Test (ECT) | | | | | | | |
| Average of 12 | lbf/in | 60 | 2 | 60 | 1 | 59 | 1 |
| Minimum | | 60 | | 60 | | 60 | |
| Nb. under minimum | | 2 | | 2 | | 3 | |
| Flat Crush Test (FCT) | | | | | | | |
| Average of 10 | kPa | 498 | 6 | 532 | 23 | 549 | 18 |
| Minimum | | 283 | | 283 | | 283 | |
| Target | | 331 | | 331 | | 331 | |
| Pin Adhesion | | | | | | | |
| Double Back | kg/m of | 71 | 0 | 69 | 0 | 71 | 4 |
| Single Face | glue line | 74 | 7 | 78 | 5 | 75 | 8 |
| Minimum | | 60 | | 60 | | 60 | |
| Target | | 75 | | 75 | | 75 | |
| Glue lines measurement | | | | | | | |
| Double Back liner | mm | 1.1 | 0.2 | 1.0 | 0.1 | 1.1 | 0.1 |
| Double Back medium | | 1.7 | 0.1 | 1.9 | 0.1 | 1.9 | 0.1 |
| Ratio DB liner/DB medium | | 0.6 | | 0.5 | | 0.6 | |
| Recommended minimum | | 0.7 | | 0.7 | | 0.7 | |
| Single Face medium | | 2.0 | 0.3 | 2.0 | 0.1 | 2.0 | 0.1 |
| Single Face liner | | 1.8 | 0.2 | 1.7 | 0.1 | 1.6 | 0.1 |
| Ratio SF liner/SF medium | | 0.9 | | 0.9 | | 0.8 | |
| Recommended minimum | | 0.7 | | 0.7 | | 0.7 | |

Legend:
*Liners had approximately 2 to 3 $lb/1000\ ft^2$ of PE and coating

Box Properties "Standard Conditions" (Treated Mediums 1 and 2 & Curtain Coated)

Basis weight of liners and mediums used to produce these boxes were all same basis weight except the medium from treated medium 1 box which has a basis weight of 37.5 $lb/1000\ ft^2$ instead of 40 $lb/1000\ ft^2$. The treated medium 2 and the treated medium 1 boxes were produced with recycled liners and the Curtain Coated boxes were produced with Kraft liners. According to literature, for a same basis weight, physical properties of the Kraft liners were stronger than physical properties of the recycled liners.

We had to consider that treated medium 2 and treated medium 1 boxes have approximately 2 to 3 $lb/1000\ ft^2$ (10 to 15 $g/m^2$) of PE plus coating on both liners compared to the Curtain Coated box which have approximately 30 to 35 $g/m^2$ of wax on both liners. So, the combined board weight demonstrates this fact and it may be possible that some properties will be higher for the Curtain Coated boxes due to the over weight (Table 10).

TABLE 10

Boxes results (Standard conditions)

| Tests | Units | HyShield™ box with treated medium 1* | | HyShield™ box with treated medium 2* | | Curtain coated** box | |
|---|---|---|---|---|---|---|---|
| | | Average | Std. Dev. | Average | Std. Dev. | Average | Std. Dev. |
| Basis Weight | | | | | | | |
| Double Back | $g/m^2$ | 281 Recycled | | 280 Recycled | | 311 Kraft | |
| Medium | | 192 Recycled | | 195 SCCM | | 197 SCCM | |
| Single Face | | 285 Recycled | | 276 Recycled | | 317 Kraft | |

TABLE 10-continued

Boxes results (Standard conditions)

| Tests | Units | HyShield ™ box with treated medium 1* | | HyShield ™ box with treated medium 2* | | Curtain coated** box | |
|---|---|---|---|---|---|---|---|
| | | Average | Std. Dev. | Average | Std. Dev. | Average | Std. Dev. |
| Adhesive | | WRA | | WRA | | WRA | |
| Total combined board weight | g/m² | 850 | | 846 | | 911 | |
| Spec. Nominal Weight | | 273-195-273 | | 273-195-273 | | N/A | |
| Poss. Nominal Weight | | 273-195-273 | | 273-195-273 | | 273-195-273 | |
| Poss. Nominal Weight | lb/1000 ft² | 56-40-56 | | 56-40-56 | | 56-40-56 | |
| Possible SAP code | | C60RB-RB | | C60RB-RB | | C60KB-KB | |
| Caliper | | | | | | | |
| Average of 10 (Unprinted) | mm | 4.30 | 0.02 | 4.31 | 0.02 | 4.53 | 0.01 |
| Average of 10 (Printed) | | 4.32 | 0.03 | 4.32 | 0.02 | 4.46 | 0.05 |
| Deflection | | −0.02 | | −0.01 | | 0.07 | |
| Edge Crush Test (ECT) | | | | | | | |
| Average of 24 | lbf/in | 57 | 2 | 57 | 3 | 72 | 4 |
| Minimum | | 55 | | 55 | | 55 | |
| Nb. under minimum | | 7 | | 5 | | 0 | |
| Flat Crush Test (FCT) | | | | | | | |
| Average of 10 | kPa | 499 | 12 | 325 | 21 | 404 | 20 |
| Minimum | | 283 | | 283 | | 283 | |
| Target | | 331 | | 331 | | 331 | |
| Pin Adhesion | | | | | | | |
| Double Back | kg/m of | 76 | 4 | 52 | 5 | 88 | 5 |
| Single Face | glue line | 72 | 6 | 58 | 2 | 90 | 2 |
| Minimum | | 60 | | 60 | | 60 | |
| Target | | 75 | | 75 | | 75 | |
| 4-pt. Bending Stiffness | | | | | | | |
| Machine Direction | Nm | 13.56 | 0.38 | 13.02 | 0.42 | 18.84 | 0.45 |
| Cross Direction | | 7.28 | 0.38 | 7.99 | 0.21 | 12.33 | 0.61 |
| Box Compression | | | | | | | |
| Compression strength (Average of 4) | kgf | 397 | 40 | 350 | 18 | 416 | 23 |
| Deflection (Average of 4) | mm | 9.2 | 0.7 | 8.0 | 0.9 | 10.3 | 0.4 |
| DST | | | | | | | |
| Total average of 10 | BPI | 20.6 | 1.6 | 19.0 | 2.2 | 18.0 | 5.1 |
| Average of 5 (Unprinted) | | 21.8 | 0.8 | 20.8 | 0.7 | 22.2 | 2.9 |
| Average of 5 (Printed) | | 19.3 | 1.1 | 17.3 | 1.7 | 13.8 | 2.5 |
| Difference % (Unprinted/Printed) | | 12 | | 17 | | 38 | |
| Wet Shear - « MBR » | | | | | | | |
| Average of 5 (Direction #1) - DB | sec | 167 | 29 | 1080 | 177 | >3600 | N.A. |
| Average of 5 (Direction #2) - DB | | 161 | 3 | 1049 | 243 | >3600 | |
| Average of 5 (Direction #1) - SF | sec | 138 | 6 | 898 | 111 | >3600 | |
| Average of 5 (Direction #2) - SF | | 147 | 12 | 998 | 206 | >3600 | |
| WRA | | | | | | | |
| Double back | mm | 2 | 1 | 6 | 4 | 3 | 1 |
| Single face | | Failed | | Failed | | 2 | 2 |

Legend:
*Liners had approximately 2 to 3 lb/1000 ft² of PE & coating on each sides
**Liners had approximately 35 g/m² of wax on each sides (Curtain Coated)

TABLE 11

Boxes results (Refrigerated conditions)

| Tests | Units | HyShield ™ box with treated medium 1* | | HyShield ™ bo with treated medium 2* | | Curtain Coated** box | |
|---|---|---|---|---|---|---|---|
| | | Average | Std. Dev. | Average | Std. Dev. | Average | Std. Dev. |
| Basis Weight | | | | | | | |
| Double Back | g/m² | 281 Recycled | | 280 Recycled | | 286 Kraft | |
| Medium | | 192 Recycled | | 195 SCCM | | 201 SCCM | |
| Single Face | | 285 Recycled | | 276 Recycled | | 279 Kraft | |

TABLE 11-continued

Boxes results (Refrigerated conditions)

| Tests | Units | HyShield ™ box with treated medium 1* | | HyShield ™ bo with treated medium 2* | | Curtain Coated** box | |
|---|---|---|---|---|---|---|---|
| | | Average | Std. Dev. | Average | Std. Dev. | Average | Std. Dev. |
| Adhesive | | WRA | | WRA | | WRA | |
| Total combined board weight | $g/m^2$ | 850 | | 846 | | 911 | |
| Spec. Nominal Weight | | 273-195-273 | | 273-195-273 | | — | |
| Poss. Nominal Weight | | 273-195-273 | | 273-195-273 | | 273-195-273 | |
| Poss. Nominal Weight | $lb/1000\ ft^2$ | 56-40-56 | | 56-40-56 | | 56-40-56 | |
| | Type of surface treatment and basis weight | | | | | | |
| Basis weight per sides | $g/m^2$ | ~10 to 15 | | | | ~30 to 35 | |
| | $lb/1000\ ft^2$ | ~2 to 3 | | | | ~6 to 7 | |
| Type of surface treatment | | PE + coating | | | | Wax | |
| | Edge Crush Test (ECT) Refrigerated Conditions (~4° C.; ~80% R.H.) | | | | | | |
| Average of 24 | lbf/in | 54 | 2 | 53 | 4 | 68 | 4 |
| | Flat Crush Test (FCT) Refrigerated Conditions (~4° C.; ~80% R.H.) | | | | | | |
| Average of 10 | kPa | 344 | 18 | 324 | 20 | 404 | 31 |
| | Box Compression Refrigerated Conditions (~4° C.; ~80% R.H.) | | | | | | |
| Compression strength (Average of 5) | kgf | 401 | 42 | 338 | 19 | | |
| Compression strength (Average of 2) | | | | | | 421 | 1 |
| Deflection (Average of 5) | mm | 8.0 | 1.2 | 7.7 | 0.8 | | |
| Deflection (Average of 2) | | | | | | 9.5 | 0.3 |

Legend:
*Liners had approximately 2 to 3 $lb/1000\ ft^2$ of PE and coating
**Wax from liners was remove using an extraction method. Basis weight were only kraft liners.

We observed normal T/B compression for treated medium 1 and Curtain Coated boxes even if we noticed a creasing mark on the Curtain Coated boxes for the Curtain Coated boxes). However, we observed, before the T/B compression, on the treated medium 2 boxes, that the glue tab delaminated between the double back and medium liners (Images 25 to 28). This may be due to a brittle and stiff board and a poor pin adhesion on the DB side.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A water-, oil- and grease-resistant multilayer coating for a paper-based substrate comprising:
    a water-based inner primer coating comprising 0.01 $g/m^2$ of polyethyleneimine (PEI);
    an intermediate polymeric extrusion coating comprising 10 $g/m^2$ of co-extruded low-density polyethylene (LDPE) and high-density polyethylene (HDPE) by weight ratio about 40/60 respectively; and
    5 $g/m^2$ of a water-based top barrier coating,
wherein a surface of the paper-based substrate coated therewith has water, oil and grease barrier properties, and wherein the paper-based substrate coated therewith is repulpable and recyclable.

2. The water-, oil- and grease-resistant multilayer coating of claim 1, wherein the water-based inner primer coating acts as an adhesion promoter for the intermediate polymeric extrusion coating.

3. The water-, oil- and grease-resistant multilayer coating of claim 1, wherein the intermediate polymeric extrusion coating provides flexibility, water, oil and grease barrier properties.

4. The water-, oil- and grease-resistant multilayer coating of claim 1, wherein the water-based top barrier coating provides additional water, oil and grease barrier properties onto the intermediate polymeric extrusion coating.

5. The water-, oil- and grease-resistant multilayer coating of claim 1, wherein the water-based top barrier coating acts as a protective layer for the intermediate polymeric extrusion coating for corrugated applications.

6. The water-, oil- and grease-resistant multilayer coating of claim 1, wherein the water-, oil- and grease-resistant multilayer coating preserves physical properties of the surface of the paper-based substrate coated therewith.

7. The water-, oil- and grease-resistant multilayer coating of claim 1, wherein physical properties comprises mechanical strength, printability and gluability.

8. The water-, oil- and grease-resistant multilayer coating of claim 7, wherein the mechanical strength comprises resistance to tear, burst, ring crush, short span compression strength (STFI), tensile, tensile energy absorption (TEA) stiffness, box compression strength (BCT), edge crush strength (ECT), flat crush strength (FCT), or a combination thereof.

9. The water-, oil- and grease-resistant multilayer coating of claim 1, wherein the water-based inner primer coating is formed from a water-based composition having at least one solvent-based adhesive.

10. The water-, oil- and grease-resistant multilayer coating of claim 9, wherein the solvent-based adhesive comprises water as a solvent.

11. The water-, oil- and grease-resistant multilayer coating of claim 1, wherein the intermediate polymeric extrusion coating is obtained by extrusion of a polymer or co-extrusion of polymers.

12. The water-, oil- and grease-resistant multilayer coating of claim 11, wherein the intermediate polymeric extrusion coating further comprises a low surface tension polymer.

13. The water-, oil- and grease-resistant multilayer coating of claim-12, wherein the low surface tension polymer consists of low density polyethylene (LDPE).

14. The water-, oil- and grease-resistant multilayer coating of claim 1, wherein the water-based top barrier coating is formed from a water-based composition having at least one polymer providing water, oil and grease barrier properties.

15. The water-, oil- and grease-resistant multilayer coating of claim 9, wherein the solvent-based adhesive is selected from the group consisting of polyethyleneimine (PEI), styrene-butadiene copolymer, styrene-acrylic copolymer, styrene-acrylic-acrylonitrile copolymer, polyester-polyurethane elastomer, acrylates, starch, PVOH (polyvinyl alcohol), PVAc (polyvinyl acetate), PVDC (polyvinylidene chloride), LDPE emulsions, HDPE emulsions, Nylon emulsions, clay coating, PHA/PHB, dextrin and combinations thereof.

16. The water-, oil- and grease-resistant multilayer coating of claim-11, wherein the polymer to be extruded or co-extruded is selected from the group consisting of polyethylene (PE), polylactic acid (PLA), PBS, PBAT, PP, PET, Nylon, EVOH, EMA, and combinations thereof.

17. The water-, oil- and grease-resistant multilayer coating of claim-16 further comprises an inorganic extrusion master batch as a filler.

18. The water-, oil- and grease-resistant multilayer coating of claim 17, wherein the inorganic extrusion master batch is selected from the group consisting of calcium carbonate, clays, talc, titanium dioxide and combinations thereof.

19. The water-, oil- and grease-resistant multilayer coating of claim 16, wherein the polyethylene is selected from the group consisting of low-density polyethylene (LDPE), high-density polyethylene (HDPE), metallocene linear low-density polyethylene (mLLDPE) and combinations thereof.

20. The water-, oil- and grease-resistant multilayer coating of claim 14, wherein the at least one polymer is selected from the group consisting of styrene-acrylic copolymer, styrene-acrylic-acrylonitrile copolymer, styrene-butadiene copolymer, PVDC, PVOH, Starch, PLA emulsion, PHA/PHB emulsion, LDPE emulsions, HDPE emulsions, Nylon emulsions, polyurethane, silicones emulsions and combinations thereof.

21. The water-, oil- and grease-resistant multilayer coating of claim 1, wherein the surface of the paper-based substrate coated therewith presents a Cobb test value below 2.0 gram of water/m$^2$, a Water Vapor Transmission Rate (WVTR) test value below 60.0 grams of water/m$^2$, a surface tension test value at least about 50.0 dynes/cm and an oil and grease resistance 3M kit test value of at least about 12.0.

22. A water-, oil- and grease-resistant multilayer coating for paper-based substrate, comprising:
  an inner water-based primer coating comprising 0.01 g/m$^2$ of polyethyleneimine (PEI);
  an intermediate polymeric extrusion coating comprising 10 g/m$^2$ of co-extruded low-density polyethylene (LDPE) and high-density polyethylene (HDPE) in a three-layers HDPE-LDPE-HDPE arrangement where HDPE represents 60% by weight of the total weight of the intermediate polymeric extrusion coating; and
  5 g/m$^2$ of a top water-based barrier coating.

* * * * *